US011198213B2

(12) United States Patent
Chen et al.

(10) Patent No.: US 11,198,213 B2
(45) Date of Patent: Dec. 14, 2021

(54) FLEXIBLE DRIVER, ROBOT JOINT, ROBOT AND EXOSKELETON ROBOT

(71) Applicant: SHENZHEN MILEBOT ROBOTICS CO., LTD., Shenzhen (CN)

(72) Inventors: Gong Chen, Shenzhen (CN); Jing Ye, Shenzhen (CN); Feng Hu, Shenzhen (CN)

(73) Assignee: SHENZHEN MILEBOT ROBOTICS CO., LTD., Shenzhen (CN)

( * ) Notice: Subject to any disclaimer, the term of this patent is extended or adjusted under 35 U.S.C. 154(b) by 801 days.

(21) Appl. No.: 16/075,741

(22) PCT Filed: Aug. 7, 2017

(86) PCT No.: PCT/CN2017/096228
§ 371 (c)(1),
(2) Date: Aug. 6, 2018

(87) PCT Pub. No.: WO2018/086393
PCT Pub. Date: May 17, 2018

(65) Prior Publication Data
US 2019/0030707 A1 Jan. 31, 2019

(30) Foreign Application Priority Data

Nov. 10, 2016 (CN) .......................... 201610991547.1
Nov. 30, 2016 (CN) .......................... 201611082307.6

(51) Int. Cl.
*G05B 19/04* (2006.01)
*B25J 9/00* (2006.01)
(Continued)

(52) U.S. Cl.
CPC .............. *B25J 9/0006* (2013.01); *B25J 5/007* (2013.01); *B25J 9/0078* (2013.01); *B25J 9/0084* (2013.01);
(Continued)

(58) Field of Classification Search
CPC . B25J 13/085; B25J 18/04; B25J 19/02; B25J 5/007; B25J 9/0006; B25J 9/044;
(Continued)

(56) References Cited

U.S. PATENT DOCUMENTS 7,862,524 B2 * 1/2011 Carignan ............. A61H 1/0281
601/5
9,844,447 B2 * 12/2017 van der Merwe ........ A61F 2/68
(Continued)

FOREIGN PATENT DOCUMENTS

CN 105479485 * 4/2016
CN 105479485 A 4/2016
(Continued)

OTHER PUBLICATIONS

International Search Report dated Nov. 8, 2017 of corresponding application No. PCT/CN2017/096228; 6 pgs.

*Primary Examiner* — Harry Y Oh
(74) *Attorney, Agent, or Firm* — Maier & Maier, PLLC

(57) ABSTRACT

A flexible driver, a robot joint, a robot and an exoskeleton robot, the transmission mechanism including an active rotating member, a driven rotating member and a rope, which form a rope drive relationship; wherein, the rope is tightly wound around rotating surfaces of the active rotating member and the driven rotating member, and a rotational central axis of the active rotating member is perpendicular to a rotational central axis of the driven rotating member. An output end of the driving mechanism is connected to the active rotating member, to drive rotation of the active rotating member. The output mechanism includes a flexible driving part, and an output part which is used for connecting to an external actuator. The driven rotating member drives rotation of the output part through the flexible driving part. The flexible driver drives flexibly the actuator through a (Continued)

compact structure as well as reliable and high-efficient transmission.

19 Claims, 10 Drawing Sheets

(51) Int. Cl.
  *B25J 9/10* (2006.01)
  *B25J 5/00* (2006.01)
  *B25J 9/04* (2006.01)
  *B25J 9/12* (2006.01)
  *B25J 18/04* (2006.01)
  *B25J 13/08* (2006.01)
  *B25J 19/02* (2006.01)

(52) U.S. Cl.
  CPC ............... *B25J 9/044* (2013.01); *B25J 9/102* (2013.01); *B25J 9/12* (2013.01); *B25J 18/04* (2013.01); *B25J 13/085* (2013.01); *B25J 19/02* (2013.01)

(58) Field of Classification Search
  CPC . B25J 9/12; B25J 9/0078; B25J 9/0084; B25J 9/102; A61H 1/0262; A61H 2201/1207; A61H 2201/14; A61H 2201/165; A61H 2201/1657; A61H 2201/50; A61H 2201/5058; A61H 2205/10; H04W 24/10; H04W 36/32; H04W 48/16; H04W 48/18; H04W 68/005; H04W 68/04; H04W 88/08; B65D 2205/02; B65D 41/26; B65D 43/0225; B65D 47/06; B65D 47/20; B65D 47/32; B65D 53/02
  See application file for complete search history.

(56) References Cited

U.S. PATENT DOCUMENTS

| | | | | |
|---|---|---|---|---|
| 10,195,736 | B2* | 2/2019 | Barnes | B25J 19/0016 |
| 10,449,105 | B2* | 10/2019 | Hollander | A61H 1/0266 |
| 10,548,800 | B1* | 2/2020 | Barnes | A63B 21/0004 |
| 2003/0120183 | A1* | 6/2003 | Simmons | G06F 3/011 |
| | | | | 600/595 |
| 2003/0223844 | A1* | 12/2003 | Schiele | A63B 21/00178 |
| | | | | 414/5 |
| 2012/0010749 | A1* | 1/2012 | van der Merwe | A61F 2/581 |
| | | | | 700/264 |
| 2014/0330431 | A1* | 11/2014 | Hollander | B25J 9/0006 |
| | | | | 700/245 |
| 2015/0272809 | A1* | 10/2015 | Accoto | A61H 1/0237 |
| | | | | 623/31 |
| 2015/0374579 | A1* | 12/2015 | Aelen | A61H 31/006 |
| | | | | 601/41 |
| 2016/0158029 | A1* | 6/2016 | Kuiken | A61F 2/70 |
| | | | | 623/24 |
| 2016/0262969 | A1* | 9/2016 | Ohta | A61H 1/0262 |
| 2017/0340504 | A1* | 11/2017 | Sanz Merodio | A61H 1/0262 |
| 2018/0325765 | A1* | 11/2018 | Wilmington | A61H 1/0266 |

FOREIGN PATENT DOCUMENTS

| | | |
|---|---|---|
| CN | 106078724 A | 11/2016 |
| CN | 106389073 A | 2/2017 |
| CN | 106514646 A | 3/2017 |
| WO | 2012175211 A1 | 12/2012 |
| WO | 2015080596 A1 | 6/2015 |

* cited by examiner

FLEXIBLE DRIVER, ROBOT JOINT, ROBOT AND EXOSKELETON ROBOT

TECHNICAL FIELD

The present disclosure relates to the field of robot. In particular, the present disclosure relates to a flexible driver, a robot joint, a robot and an exoskeleton robot.

BACKGROUND

A robot is a machine capable of carrying out works automatically. With the development of artificial intelligence technologies, the robot has made great progress and increasing functions. The robot can assist or replace humans in performing their jobs, which greatly improves life quality and production efficiency, and avoids the danger of manual operations. Thus, robots are increasingly used in various fields. With the development of technology, more and more robots are used in physical therapy for humans. For example, exoskeleton robots have been widely used in the physical therapy for paraplegic individuals. Further, exoskeleton mechanical arms are also on the rise.

A robot is generally composed of an actuating mechanism, a driver, a detector, a control system, a complex mechanical device and the like, in which the driver is a driving mechanism for driving a robot to act and is an indispensable key part of the robot.

Most of existing exoskeleton robots employ rigid drivers. However, a rigid driver has certain difficulty in controlling the power of the human-machine interaction. In use, the rigid driver has a hidden danger of losing stability, which may easily hurt a human body. A flexible driver is employed by a small number of exoskeleton robots. Currently, the flexible driver generally adopts structures such as a screw or transmission gear. However, due to the limitation of its design structure, the existing flexible driver has a relative large structural size, a relative large local volume, and increased overall weight. As a result, the robot has larger overall size and heavier weight, which make it inconvenient to use. This greatly restricts the application of the robot. Moreover, the large structural size of a robot would result in low transmission efficiency and poor transmission reliability.

SUMMARY

In order to overcome the defects of the prior art, the object of the present disclosure is to provide a flexible driver, a robot joint, a robot, and an exoskeleton robot. The flexible driver may flexibly drive an external actuating mechanism through a compact structure as well as a reliable and high-efficient transmission.

In order to achieve the above object, the present disclosure provides a flexible driver, which may include a driving mechanism, a transmission mechanism, and an output mechanism. The transmission mechanism may include an active rotating member, a driven rotating member and a rope, which form a rope drive relationship. The rope may be tightly wound around rotating surfaces of the active rotating member and the driven rotating member. And the rotational central axis of the active rotating member is perpendicular to the one of the driven rotating member. The output end of the driving mechanism may be connected to the active rotating member, to drive rotation of the active rotating member. The output mechanism may include a flexible driving part, and an output part which is used for connecting to an external actuator. The driven rotating member may drive rotation of the output part through the flexible driving part.

Optionally, the output part may be mounted on the mounting shaft of the driven rotating member. A first receiving space may be formed on the driven rotating member, and a second receiving space, which corresponds to the first receiving space, may be formed on the output part. The flexible driving part may be received in the first receiving space and the second receiving space, such that the rotation of the driven rotating member may be transferred to the output part through the flexible driving part.

Optionally, the first receiving space may be formed as an arc-shaped groove extending along the circumferential direction of the driven rotating member. The shape of the second receiving space may substantially match the shape of the first receiving space. The flexible driving part may be a spring, and both ends of the spring correspondingly press against two end faces of each of the first receiving space and the second receiving space.

Optionally, the two end faces of the second receiving space are provided with limiting units extending inward, and two ends of the spring are respectively sleeved on the limiting units.

Optionally, the transmission mechanism may further include a spring cover which is fixed to the driven rotating member and covers the spring, and the output part may be, along the axial direction of the mounting shaft, positioned between the driven rotating member and the spring cover.

Optionally, the flexible driver may be provided with two springs, and further with two symmetrically-arranged first receiving spaces and two symmetrically-arranged second receiving spaces.

Optionally, the active rotating member may be a reel having a rotation shaft, and an output end of the driving mechanism may be connected to the rotation shaft to drive the rotation of the reel. The driven rotating member may be a rotating wheel, and the rope may be wound around the rotating surface of the reel, and extend and wound around the rotating wheel.

Optionally, the transmission mechanism may further include a tensioning wheel for tensioning the rope.

Optionally, a rotational central axis of the tensioning wheel may be parallel to a rotational central axis of the rotating wheel.

Optionally, the flexible driver may further include a first sensor and a second sensor. The first sensor may be used for measuring an angular displacement and angular velocity of the driving mechanism's output end or the transmission mechanism's input end. The second sensor may be used for measuring an angular displacement and angular velocity of the output part.

Optionally, the flexible driver may further include a gear transmission group which may include a first gear and a second gear that mesh with each other. The first gear may be mounted at an output end of the driving mechanism or at an input end of the transmission mechanism. The second gear may be connected to the first sensor.

Optionally, the flexible driver may further include a belt transmission group which may include a driving pulley, a driven pulley and a transmission belt that form as a belt transmission. The driving pulley may be connected to the output part and rotated with it synchronously. The driven pulley may be connected to the second sensor.

Optionally, both the first sensor and the second sensor are encoders.

Optionally, the driving mechanism may include a motor and a decelerator. An output shaft of the decelerator may be connected to the active rotating member through a coupling.

The present disclosure may further provides a robot joint, which may include a first joint member, a second joint member, and a flexible driver. The flexible driver may be mounted on the first joint member. An output end of the flexible driver may be connected to the second joint member. The flexible driver may be the flexible driver as described above.

Optionally, the first joint member may be a thigh member and the second joint member may be a lumbar support assembly. Alternatively, the first joint member may be a thigh member and the second joint member may be a lower leg member. Alternatively, the first joint member may be a lower leg member and the second joint member may be a foot member. Alternatively, the first joint member may be a shoulder member and the second joint member may be an upper arm member. Alternatively, the first joint member may be an upper arm member and the second joint member may be a forearm member. Alternatively, the first joint member may be a forearm member and the second joint member may be a hand member.

The present disclosure further provides a robot which may include the robot joint as described above.

The present disclosure further provides an exoskeleton robot, which may include a lumbar support assembly and a leg exoskeleton assembly. The lumbar support assembly may be used for supporting a waist of a human body. The leg exoskeleton assembly may be used for supporting a leg of a human body. The leg exoskeleton assembly may includes a connector, a thigh member, a lower leg member and a foot member, which may be sequentially arranged to construct a leg structure of a human body. The connector may be detachably connected to the lumbar support assembly. The connector may be rotatably connected to the thigh member to construct a hip joint of the leg exoskeleton assembly. The thigh member may be rotatably connected to the lower leg member to construct a knee joint of the leg exoskeleton assembly. The lower leg member may be rotatably connected to the foot member to construct an ankle joint of the leg exoskeleton. At least one of the hip joint, knee joint and ankle joint is the above-described robot joint.

Optionally, the lumbar support assembly may include a back board, and two side boards that are respectively arranged at both ends of the back board and extended forward. The two side boards may be detachably connected to the back board so as to be capable of getting close to or away from each other; and/or the connector may be detachably connected to the side board so as to be capable of getting close to or away from the back board; and/or the thigh member may be detachably connected to the connector so as to be capable of getting close to or away from the connector; and/or the lower leg member may be detachably connected to the thigh member so as to be capable of getting close to or away from the thigh member; and/or the foot member may be detachably connected to the lower leg member so as to be capable of getting close to or away from the lower leg member.

With the above technical solution, the active rotating member and the driving rotating member of the transmission mechanism may form a rope drive relationship, and the rotational central axis of the active rotating member may be perpendicular to the one of the driven rotating member, so that the transmission distance of the transmission mechanism is reduced and the structure is compact, thereby effectively reducing the spatial size of the transmission mechanism, and enhancing transmission reliability and transmission efficiency. At the same time, it realizes the flexible driving of the external actuating mechanism by means of the flexible driver.

Additional features and advantages of the present disclosure will be detailed in the following detailed description.

BRIEF DESCRIPTION OF THE DRAWINGS

The accompanying drawings are intended to further illustrate the present disclosure and constitute a part of this specification. The accompanying drawings, together with the following detailed description, serve to explain the present disclosure, but do not constitute a limitation to the present disclosure, in which.

DETAILED DESCRIPTION

Figure 1:
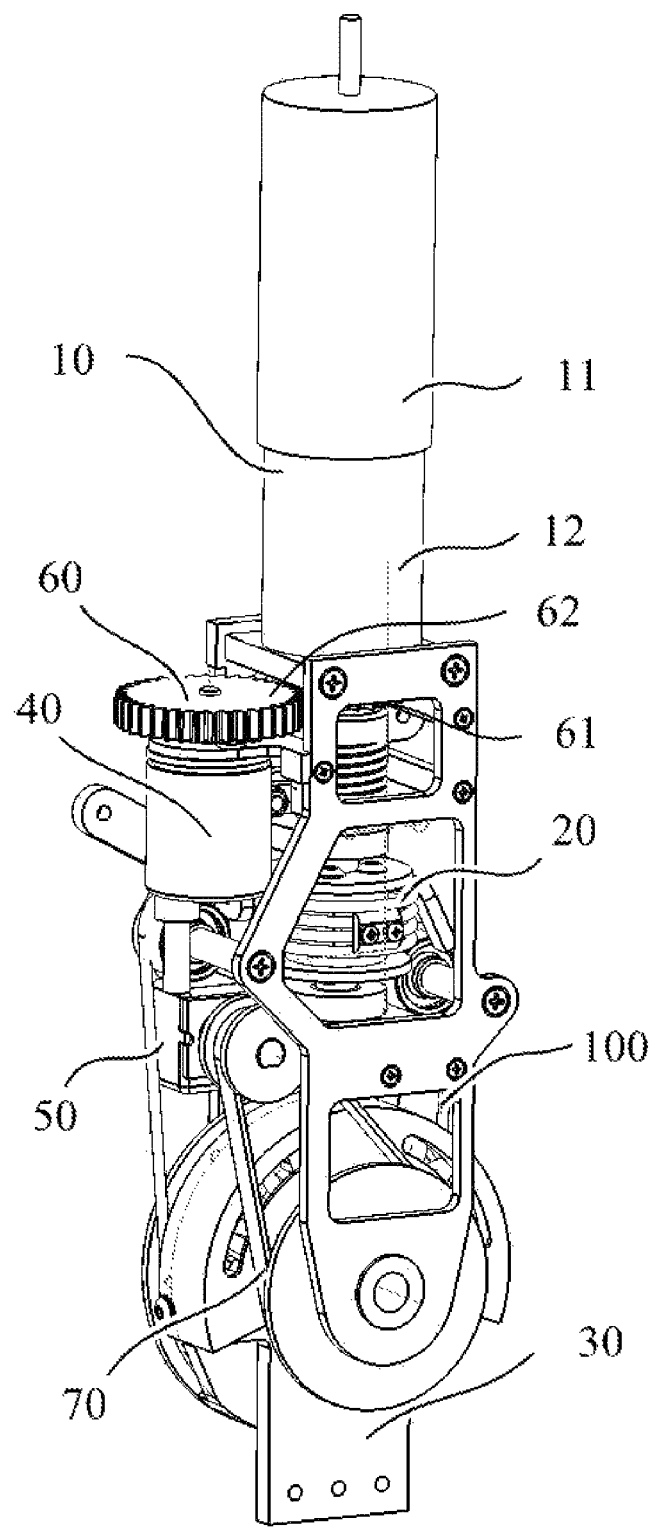
FIG. 1 is a perspective view of an overall structure of a flexible driver according to an embodiment of the present disclosure.

Hereinafter, the specific embodiments of the present disclosure will be described with details with reference to the accompanying drawings. It should be understood that the specific embodiments described herein are only used to illustrate and explain the present disclosure, but are not intended to limit the present disclosure.

Referring to FIGS. 1 to 4, an embodiment of the present disclosure provides a flexible driver 100, which includes a driving mechanism 10, a transmission mechanism 20 and an output mechanism 30. The transmission mechanism 20 includes an active rotating member 21, a driven rotating member 22 and a rope 23, which form a rope drive relationship. The rope 23 is tightly wound around the rotating surfaces of the active rotating member 21 and the driven rotating member 22. The rotating central axis of the active rotating member 21 is perpendicular to the rotating central axis of the driven rotating member 22. The output end of the driving mechanism 10 is connected to the active rotating member 21, so as to drive the rotation of the active rotating member 21. The output mechanism 30 includes a flexible driving part 31, and an output part 32 which is used for connecting to an external actuator. The driven rotating member 22 drives the rotation of the output part 32 through the flexible driving part 31.

Specifically, the active rotating member 21 and the driven rotating member 22 of the transmission mechanism 20 form the rope drive relationship. The rope 23 is very flexible and only bears tension. When the rope 23 is kept in a tensioned state, there would be only a stretching force along itself. When the driving mechanism 10 drives the rotation of the active rotating member 21, a stretching force would be applied to the rope 23, such that the rope 23 could apply a stretching force on the driven rotating member 22, resulting in the rotation of the driven rotating member 22.

In particular, the rotating central axis of the active rotating member 21 is perpendicular to the rotating central axis of the driven rotating member 22, so that the transmission distance of the transmission mechanism 20 is reduced and the spatial structure thereof is very compact, thereby effectively reducing the spatial size of the transmission mechanism 20, enhancing the transmission reliability and transmission efficiency, and avoiding problems such as large size and low transmission reliability due to a too long transmission chain. In addition, the rope 23 is always in a tensioned state, which effectively guarantees the reliability and match accuracy of the transmission process.

The input end of the output mechanism 30 is connected to the output end of the transmission mechanism 20 through a flexible driving part 31. The driven rotating member 22, through the flexible driving part 31, drives the rotation of the output part 32. The output end of the output part 32 is provided with a connection part for connecting to an external actuator, such that the flexible driver 100 transfer outward movement and power. Thus, flexible driving of an external actuating mechanism, e.g. a first or second joint member, is realized by means of the flexible driver 31. When the driven rotating member 22 rotates, a driving force would be flexibly transmitted to the output part 32 through the flexible driving part 31, to make the output part 32 rotate. Thus, the requirement of flexible rotation is met and the function of the external actuating mechanism is closer to routine movements of a human body, so as to achieve good simulation effect.

Alternatively, the transmission mechanism 20 may be of another suitable transmission mode, such as a bevel gear transmission. If the transmission mechanism 20 belongs to a bevel gear transmission, the transmission mechanism 20 would include a first bevel gear and a second bevel gear, which mesh with each other, and the rotational central axis of the first bevel gear is perpendicular to the one of the second bevel gear. The driving mechanism 10 drives the rotation of the first bevel gear, such that the first bevel gear drives the rotation of the second bevel gear, and the second bevel gear, through the flexible driving part 31, drives the rotation of the output part 32.

Figure 2:
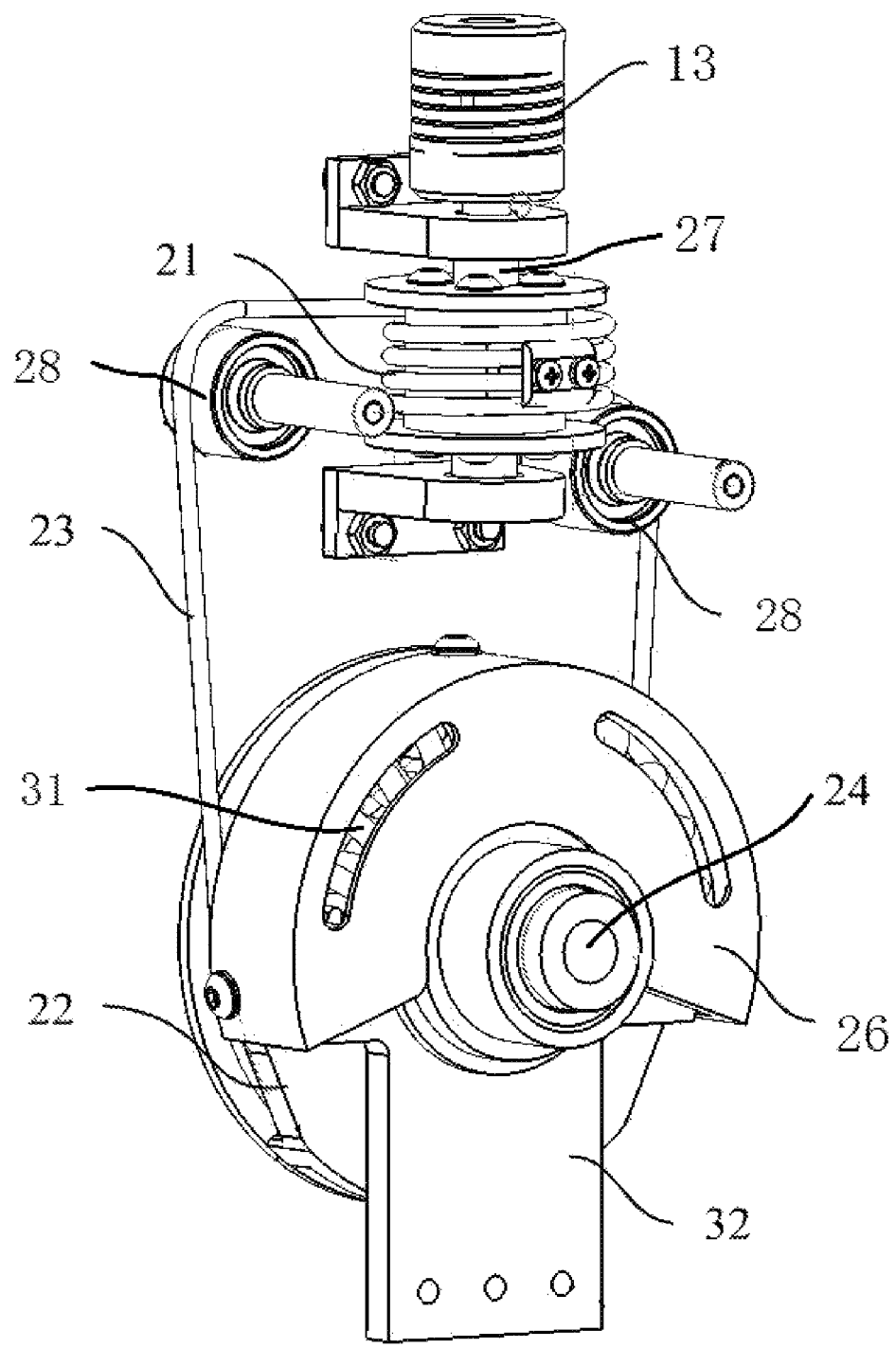
FIG. 2 is a perspective view of a partial structure of a flexible driver according to an embodiment of the present disclosure.
Figure 3:
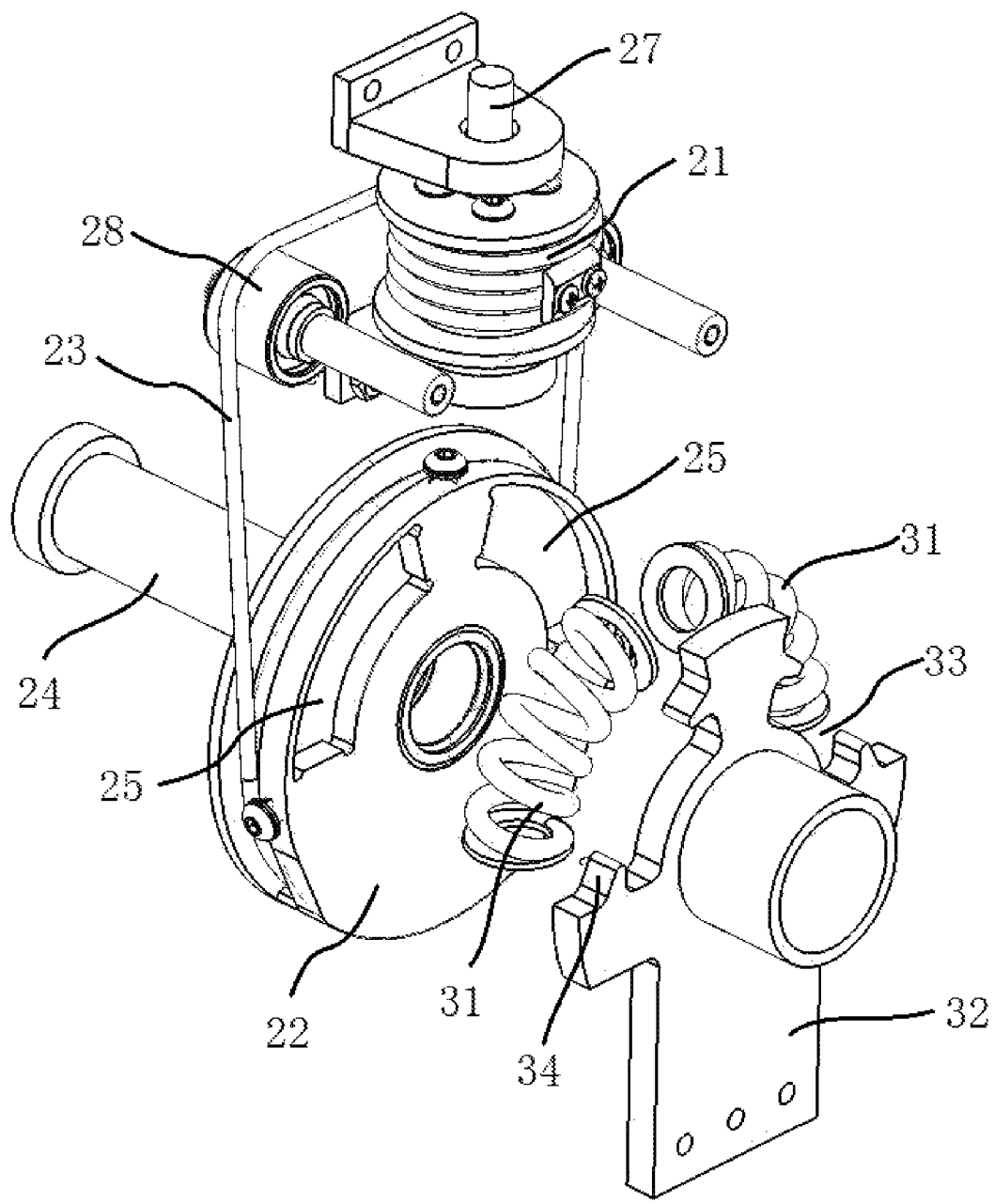
FIG. 3 is a perspective view of another partial structure of a flexible driver according to an embodiment of the present disclosure.

FIGS. 2 and 3 show a preferred assembling mode of the output mechanism 30. Specifically, the output part 32 is mounted on a mounting shaft 24 of the driven rotating member 22. The mounting shaft 24 passes through the rotation centers of the driven rotating member 22 and the output part 32. The driven rotating member 22 and the output part 32 can rotate on the mounting shaft 24, and both are close to each other along the axial direction of the mounting shaft 24 but do not contact with each other. A first receiving space 25 is formed on the driven rotating member 22, and a second receiving space 33, which corresponds to the first receiving space 25, is formed on the output part 32. The flexible driving part 31 is received in the first receiving space 25 and the second receiving space 33, such that the rotation of the driven rotating member 22 can transferred to the output part 32 through the flexible driving part 31. When the driven rotating member 22 rotates, the flexible driving part 31 would move and transfer the driving force to the output part 32 to make the output part 32 rotate.

More specifically, FIG. 3 shows a preferred assembling mode of the flexible driving part 31, in which the first receiving space 25 is formed as an arc-shaped groove extending in the circumferential direction of the driven rotating member 22. Both end surfaces of the arc-shaped groove extend in a radial direction. The shape of the second receiving space 26 substantially matches the shape of the first receiving space 25, and also has substantially an arc-shaped groove shape. The first receiving space 25 and the second receiving space 33 are close to each other along the axial direction of the mounting shaft 24, but do not contact with each other. The flexible driving part 31 is a spring, which may be one kind selected from an arc spring, a disc spring, a torsion spring and a linear spring, preferably an arc spring. The arc spring has a coaxial relationship with the driven rotating member 22 and the output part 32. One portion of the spring, which is divided by its central plane, is received in the first receiving space 25, and the other portion is received in the second receiving space 26. Both ends of the spring respectively press against the two end faces of each of the first receiving space 25 and the second receiving space 33, that is, press against both end faces of the arc-shaped groove.

Alternatively, the flexible driving part 31 can be made of an elastic material such as rubber or silica gel.

Referring to FIGS. 2 and 3, the transmission process between the driven rotating member 22 and the output part 32 will be described by taking the clockwise rotation of the driven rotating member 22 as an example. When the driven rotating member 22 rotates clockwise, the left end face of the first receiving space 25 would compress the left end of the spring, such that the spring would be deformed and compressed. In this way, the right end of the spring would press against the right end faces of the first receiving space 25 and the second receiving space 33, to apply elastic pressure on the right end face of the second receiving space 33 and thus make the output part 32 rotate. When the driven rotating member 22 rotate in a counter-clockwise direction, the transmission process is similar to that of the clockwise rotation, and will be not described again herein.

In such transmission mechanism having a large structure is arranged between the driven rotating member 22 and the output part 32, since they are arranged close to each other along the axial direction of the mounting shaft 24 and drive the output part 32 through the flexible driving part 31. Thus, the spatial size of the flexible driver 100 is further compressed and compacted, and thus has reduced space occupation and wider application. Therefore, the flexible driver 100 may be suitable for a device which may be installed in a small space.

As shown in FIG. 3, an inwardly extending limiting part 34 is provided on each of the two end faces of the second receiving space 33, in order to confine the spring in the first receiving space 25 and the second receiving space 33. Both ends of the spring sleeve on the limiting parts 34, to fix the mounting position of the spring and prevent the spring from shifting.

As shown in FIG. 2, the transmission mechanism 20 further includes a spring cover 26 in order to protect and fix the spring. The spring cover 26 is fixed to the driven rotating member 22 and covers the spring. The output part 32 is located between the driven rotating member 22 and the spring cover 26 along the axial direction of the mounting shaft 24. The spring cover 26 rotates with the driven rotating member 22, and encloses the spring in the first receiving space 25 and the second receiving space 33. The spring cover 26 further prevents the spring from being compressed by force and ejecting from the first receiving space 25 and the second receiving space 33, and also provides protection for the spring.

In addition, a third receiving space, corresponding to the second receiving space 33, may be formed on the inner surface of the spring cover 26. The shape and size of the third receiving space may be the same as the first receiving space 25. The first receiving space 25, the second receiving space 33 and the third receiving space together form a receiving space for the spring. Both ends of the spring also press against the two end faces of the third receiving space correspondingly. In this way, one portion of the spring, along its radial direction, is received in the first receiving space 25, a middle part is received in the second receiving space 33, and the remaining part is received in the third receiving space.

Referring to FIG. 3, there are two springs, two the first receiving spaces 25, and two the second receiving spaces 33. The two springs, the first receiving spaces 25, and the second receiving spaces 33 are respectively symmetrically-arranged in this embodiment. The driven rotating member 22 is provided with two adjacent first receiving spaces 25, and the output part 32 is provided with two second receiving spaces 33 corresponding to the two first receiving spaces 25. The two first receiving spaces 25 and the two second receiving space 33 are arranged symmetrically, so that the driving or braking force is the same when the driven rotating member 22 and the output part 32 are rotated in different directions, such as counter-clockwise or clockwise direction. Specifically, there are two first receiving spaces 25, two second receiving spaces 33 and two springs, which respectively are arranged symmetrically, in this embodiment.

Referring to FIGS. 1 to 3, as a preferred embodiment of the transmission mechanism 20, the active rotating member 21 is a reel having a rotation shaft 27. The output end of the driving mechanism 10 is connected to the rotation shaft 27 to drive the rotation of the reel. The driven rotating member 22 is a rotating wheel. The rope 23 is tightly wound around the rotating surface of the reel in multi-turns, and both ends of the rope 23 extend outward to wind the rotating wheel. The rotation shaft 27 is rotated by the driving mechanism 10 to make the reel rotate, so that the rope 23 is released from one side of the reel and withdrawn from the other side of the reel. In this way, the movement of the rope 23 can drive the rotation of the rotating wheel. The rotation shaft 27, which is a rotational central axis of the reel, is vertically disposed, and the rotational central axis of the rotating wheel is horizontally disposed, so that the reel and the rotating wheel can be disposed as close as possible to make the spatial configuration more compact.

As shown in FIGS. 2 and 3, the transmission mechanism 20 further includes a tensioning wheel 28 for tensioning the rope 23, in order to ensure the reliability of the rope drive. There may be two tensioning wheels 28, which are respectively arranged on both sides of the reel, so as to maintain the tensioned state of the rope 23 and prevent it from loosing, falling off and affecting the transmission reliability. Thus, the reliability and match accuracy of the transmission process can be effectively guaranteed by the two tensioning wheels 28. In addition, the two tensioning wheels 28 are respectively disposed at the output and input ends of the rope 23 to change the extending direction of the rope 23, such that the rope 23 is coordinated with the direction and position of the reel.

Further, the outer surface of the tensioning wheel 28 may be sleeved with a bearing. The rope 23 may be tightly wound around the bearing on the outer surface of the tensioning wheel 28. By the driving of the rope 23, the tensioning wheel 28 may be rotated correspondingly. The rotational central axis of the tensioning wheel 28 is parallel to that of the rotating wheel, to facilitate the arrangement of the tensioning wheel 28. The bearing can reduce the friction loss between the rope 23 and the tensioning wheel 28, and prolong the service life of the rope 23 and the tensioning wheel 28. In addition, the bearing can automatically adjust the match error of the transmission process, and improve the transmission accuracy and reliability of the rope drive.

As shown in FIG. 1, the flexible driver 100 further includes a first sensor 40 and a second sensor 50, for measuring the torque output by the flexible driver 100. Since the angular displacement and angular velocity of the output end of the driving mechanism 10 or of the input end of the transmission mechanism 20 are consistent and synchronized, the first sensor 40 may be used to measure the angular displacement and angular velocity of the output end of the driving mechanism 10 (as shown in in FIG. 1 of the present disclosure) or of the input end of the transmission mechanism 20, and the second sensor 50 may be used to measure the angular displacement and angular velocity of the output part 32. As a preferred embodiment, both the first sensor 40 and the second sensor 50 are encoders. Since the transmission ratio among individual parts of the flexible driver 100 is constant, the torque output by the output part 32 can be calculated by means of the measurement of the first sensor 40 and the second sensor 50, and be fed back to a control system of the flexible driver 100, such that the control system can control the output torque of the driving mechanism 10 to adjust the output torque of the output mechanism 30, thereby accurately control the flexible driver 100.

Optionally, one of the first sensor 40 and the second sensor 50 may be omitted.

As shown in FIG. 1, the flexible driver 100 may further includes a gear transmission group 60, which includes a first gear 61 and a second gear 62 that mesh with each other, in order to facilitate the measurement of the angular displacement and angular velocity of the output end of the driving mechanism 10 or of the input end of the transmission mechanism 20. The first gear 61 may be mounted at the output end of the driving mechanism 10 (as shown in FIG. 1 of the present disclosure) or the input end of the transmission mechanism 20, and be rotated synchronously. The second gear 62 may be connected to the input end of the first sensor 40. Since the output end of the driving mechanism 10 is connected to the input end of the transmission mechanism 20, which makes it inconvenient to connect directly to the first sensor 40, the gear transmission group 60 is configured to transmit the angular velocity and angular displacement of the output end of the driving mechanism 10 or of the input end of the transmission mechanism 20 to the first sensor 40. Thus, the first sensor 40 can make an accurate measurement.

Wherein, the first gear 61 is a small gear and the second gear 62 is a big gear, so as to measure the angular velocity and angular displacement of the output end of the driving mechanism 10 or of the input end of the transmission mechanism 20 more accurately. In addition, by means of the transmission of the gear transmission group 60, the first sensor 40 can be disposed at a suitable position, e.g. on one side of the driving mechanism 10, so that the spatial arrangement can be more compacted and the overall size can be smaller.

Figure 4:
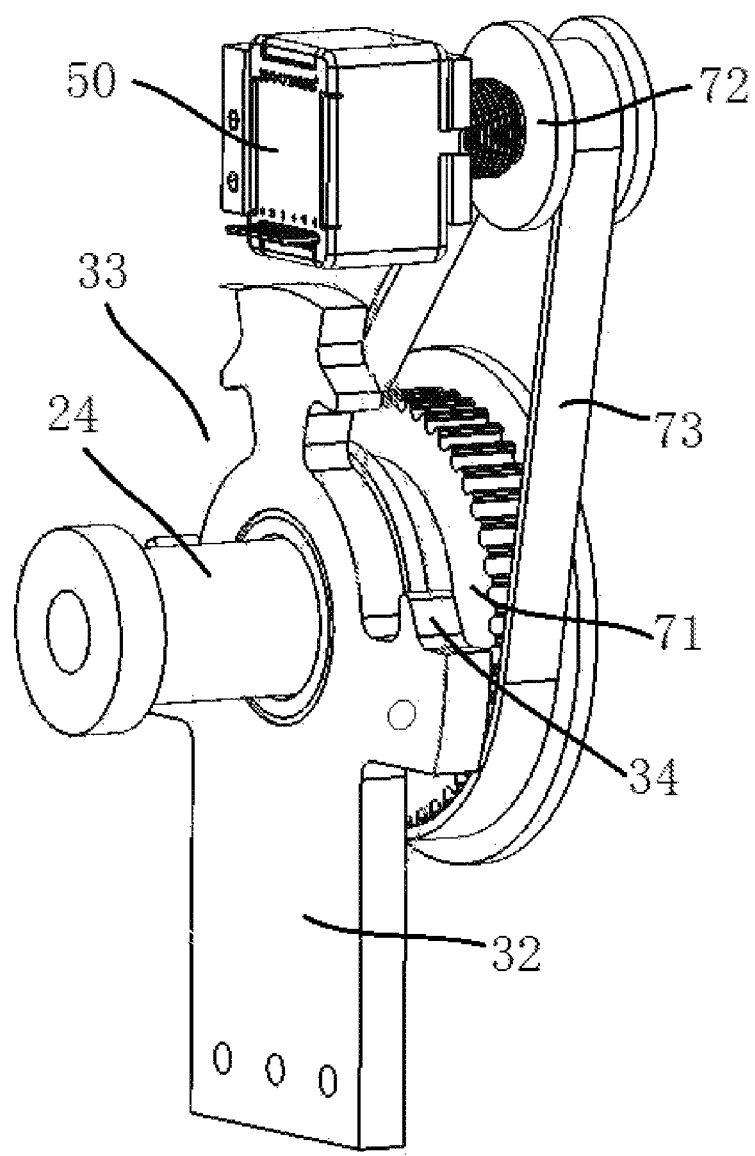
FIG. 4 is a perspective view of yet another partial structure of a flexible driver according to an embodiment of the present disclosure.

As shown in FIGS. 1 and 4, the flexible driver 100 further includes a belt transmission group 70, which includes a driving pulley 71, a driven pulley 72 and a transmission belt 73 forming as a belt transmission, in order to facilitate the measurement of the angular displacement and angular velocity of the output part 32. The driving pulley 71 is connected to the output part 32 and rotated with it synchronously. The driven pulley 72 is connected to the second sensor 50. The transmission belt 73 is tightly wound around the rotating surfaces of the driving pulley 71 and the driven pulley 72. Since the output part 32 is mounted on the mounting shaft 24 and rotated thereon, it is inconvenient for the output part 32 to directly connect to the second sensor 50. Thus, the belt transmission group 70 is provided to transmit the angular velocity and angular displacement of the output part 32 to the second sensor 50, so as to facilitates the accurate measurement of the second sensor 50.

Wherein, the driving pulley 71 is a large pulley and the driven pulley 72 is a small pulley, which are used to measure the angular velocity and angular displacement of the output part 32 more accurately. In addition, the second sensor 50 can be provided in a suitable position, such as a space between the reel and the rotating wheel, by using the belt transmission group 70 so as to fully utilize the interspace between various parts. Thus, the space arrangement can be more compacted and the overall size can be smaller.

Referring to FIGS. 1 and 2, the driving mechanism 10 may employ a suitable power device. Specifically, the driving mechanism 10 may include a motor 11 and a decelerator 12. An output shaft of the decelerator 12 is connected to the active rotating member 21 via a coupling 13. That is, the output shaft of the decelerator 12 is connected to a rotation shaft 27 of the reel to drive the reel to rotate, thereby winding up the rope 23. The motor 11 and the decelerator 12 drive or brake the rotation of the reel respectively, and provide the reel with power. The motor 11 and the decelerator 12 may be electrically connected to the control system, such that the motor 11 and the decelerator 12 are controlled to drive, brake and output torque. The decelerator 12 can reduce an output rotational speed of the motor 11 and increase the output torque of the motor 11, so that the flexible driver 100 can produce a good application effect under a condition of low rotational speed and high torque.

Optionally, the flexible driver may further include a third sensor (not shown). The third sensor may be disposed at the output end of the motor 11 and be connected to the output shaft of the motor 11, to measure the angular velocity and angular displacement of the output end of the motor 11.

Figure 5:
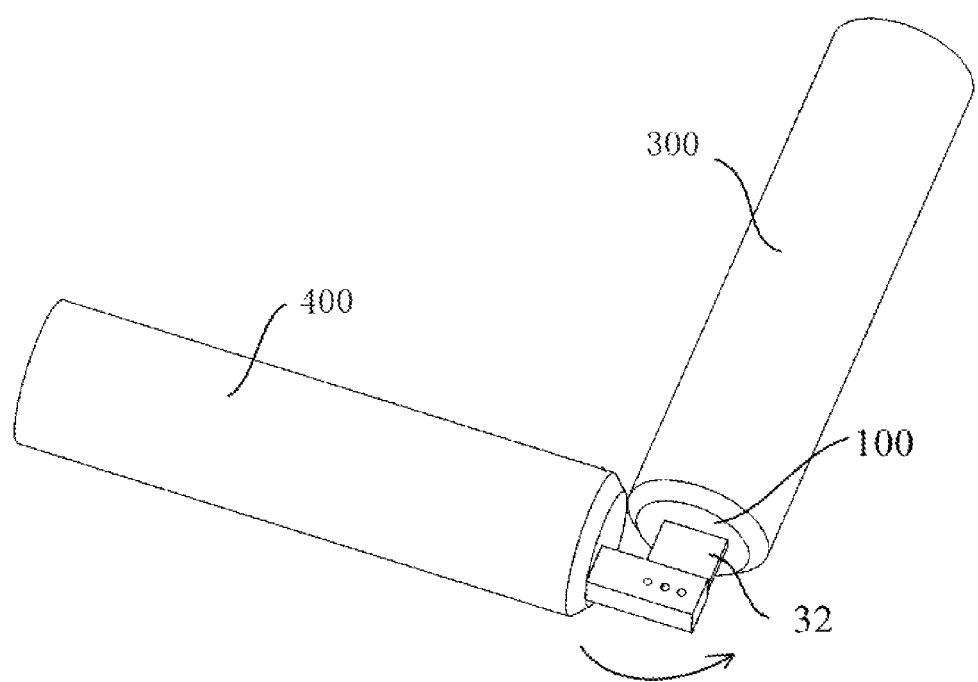
FIG. 5 is a schematic diagram of a robot joint according to an embodiment of the present disclosure.
Figure 6:
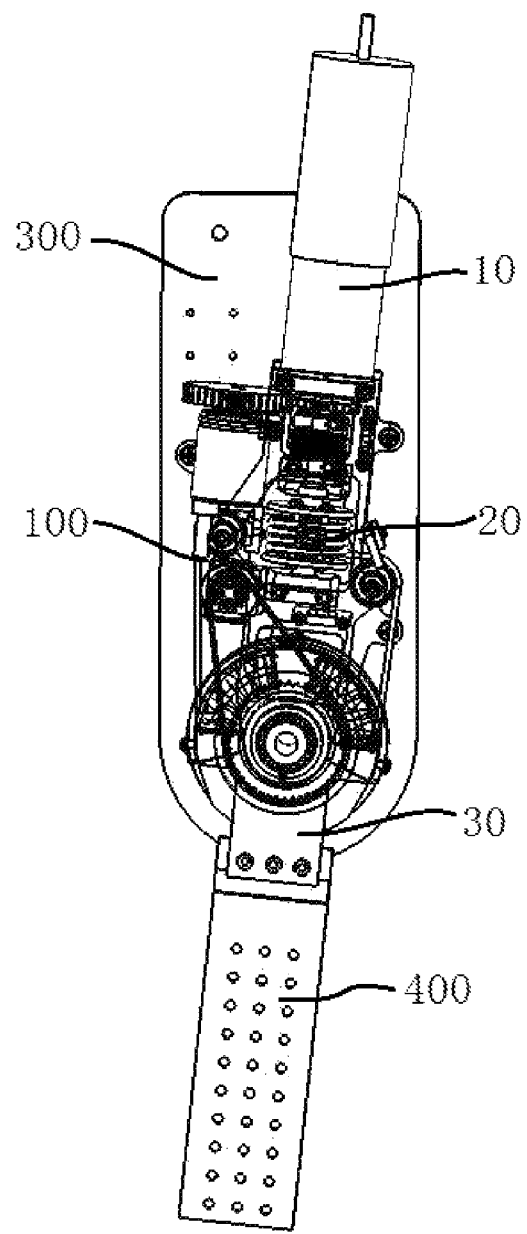
FIG. 6 is a perspective view of a robot joint according to an embodiment of the present disclosure.

As shown in FIGS. 5 and 6, an embodiment of the present disclosure provides a robot joint, which may include a first joint member, a second joint member, and a flexible driver 100. The flexible driver 100 is mounted on the first joint member, and the output end of the flexible driver 100 is connected to the second joint member. The flexible driver 100 is a flexible driver as described above, and flexibly drive the second joint member to move relative to the first joint member. In general, the flexible driver 100 is integrally mounted on the first joint member through a mounting bracket, and is connected to the second joint member through a connection part of the output part 32 of the flexible driver 100. Due to the compact structure of the flexible driver 100, the structural size of the robot joint can be reduced, thereby decreasing the occupied space thereof. In addition, the transmission chain of the flexible driver 100 is short, so that the transmission is reliable and highly efficient, the transmission error between the first and second joint members is small, and the second joint member can be flexibly driven. Thus, the flexibility and accuracy of the robot joints is improved, and is more similar to movements of a human body, resulting in good simulation effects.

Figure 7:
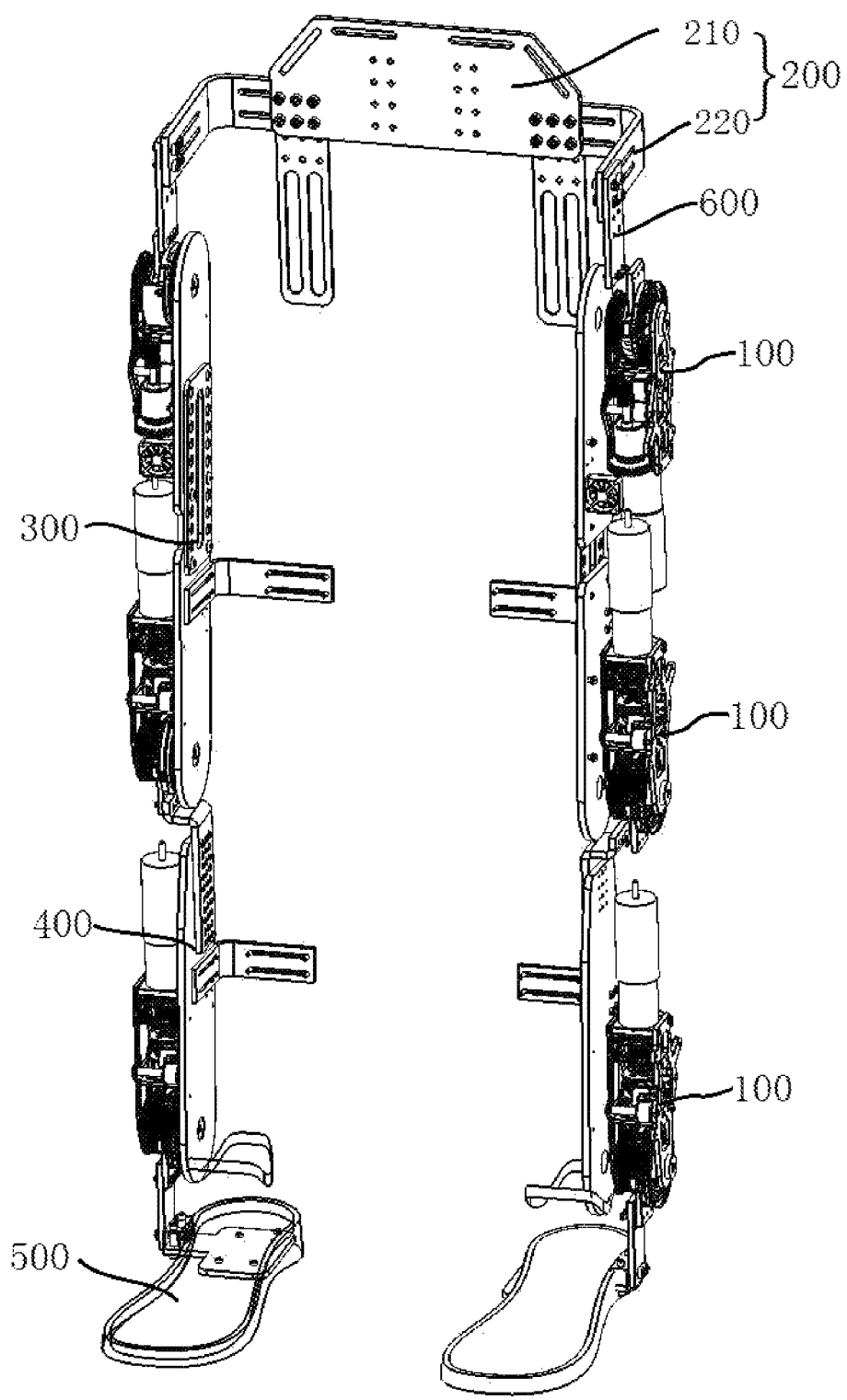
FIG. 7 is a perspective view of an exoskeleton robot according to a first embodiment of the present disclosure.
Figure 8:
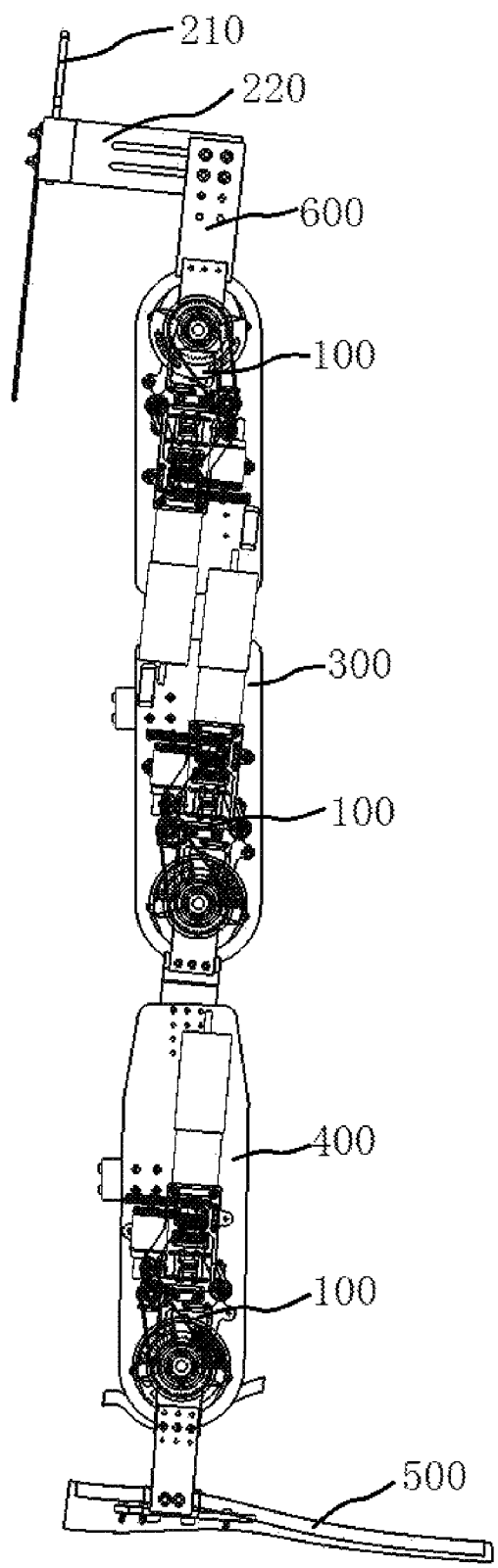
FIG. 8 is a left side view of the exoskeleton robot of FIG. 7.

Specifically, FIG. 7 shows a specific application of the robot joint, in which the first joint member is thigh member 300, the second joint member is lumbar support assembly 200, and the robot joint is constructed as a hip joint. Alternatively, the first joint member is thigh member 300, the second joint member is a lower leg member 400, and the robot joint is constructed as a knee joint. Alternatively, the first joint member is a lower leg member 400, the second joint member is a foot member 500, and the robot joint is constructed as an ankle joint. Alternatively, the first joint member is a shoulder member, the second joint member is an upper arm member, and the robot joint is constructed as a shoulder joint. Alternatively, the first joint member is an upper arm member, the second joint member is a forearm member, and the robot joint is constructed as an elbow joint. Alternatively, the first joint member is a forearm member, the second joint member is a hand member, and the robot joint is constructed as a wrist joint.

An embodiment of the present disclosure further provides a robot, which includes the robot joint as described above. Specifically, the robot is an exoskeleton robot, which includes skeleton and joint structures of a human body. The joint structure is flexibly driven as described in the present disclosure, to control the flexible rotation of the skeleton structures connected with each other through the joint structure.

Referring to FIGS. 7 to 10, the exoskeleton robot includes a lumbar support assembly 200, a leg exoskeleton assembly, and a control system (not shown). The lumbar support assembly 200 is used to support a waist of a human body, and the leg exoskeleton assembly is used to support a leg of a human body. The assembly 200 and the leg exoskeleton assembly together support a body of a patient (especially the lower part of the body). The control system can automatically control the movements of the exoskeleton robot.

Specifically, the leg exoskeleton assembly includes a connector 600, a thigh member 300, a lower leg member 400, and a foot member 500 that are sequentially disposed to construct a leg structure of a human body. The connector 600 is detachably connected to the lumbar support assembly 200 and is rotatably connected to the thigh member 300, to construct a hip joint of the leg exoskeleton assembly. The thigh member 300 is rotatably connected to a lower leg member 400 to construct a knee joint of the leg exoskeleton assembly. The lower leg member 400 is rotatably connected to the foot member 500 to construct an ankle joint of the leg exoskeleton. At least one of the hip joint, knee joint and ankle joint is the above-mentioned robot joint, so as to realize the flexible movement of the joint structure. Thus, the exoskeleton robot can be moved flexibly and accurately, and be more similar to movements of a human body, thereby producing good simulation effect. Such leg exoskeleton assembly may apply physiotherapy to paraplegic patients and help them to restore normal movements as soon as possible.

Figure 9:
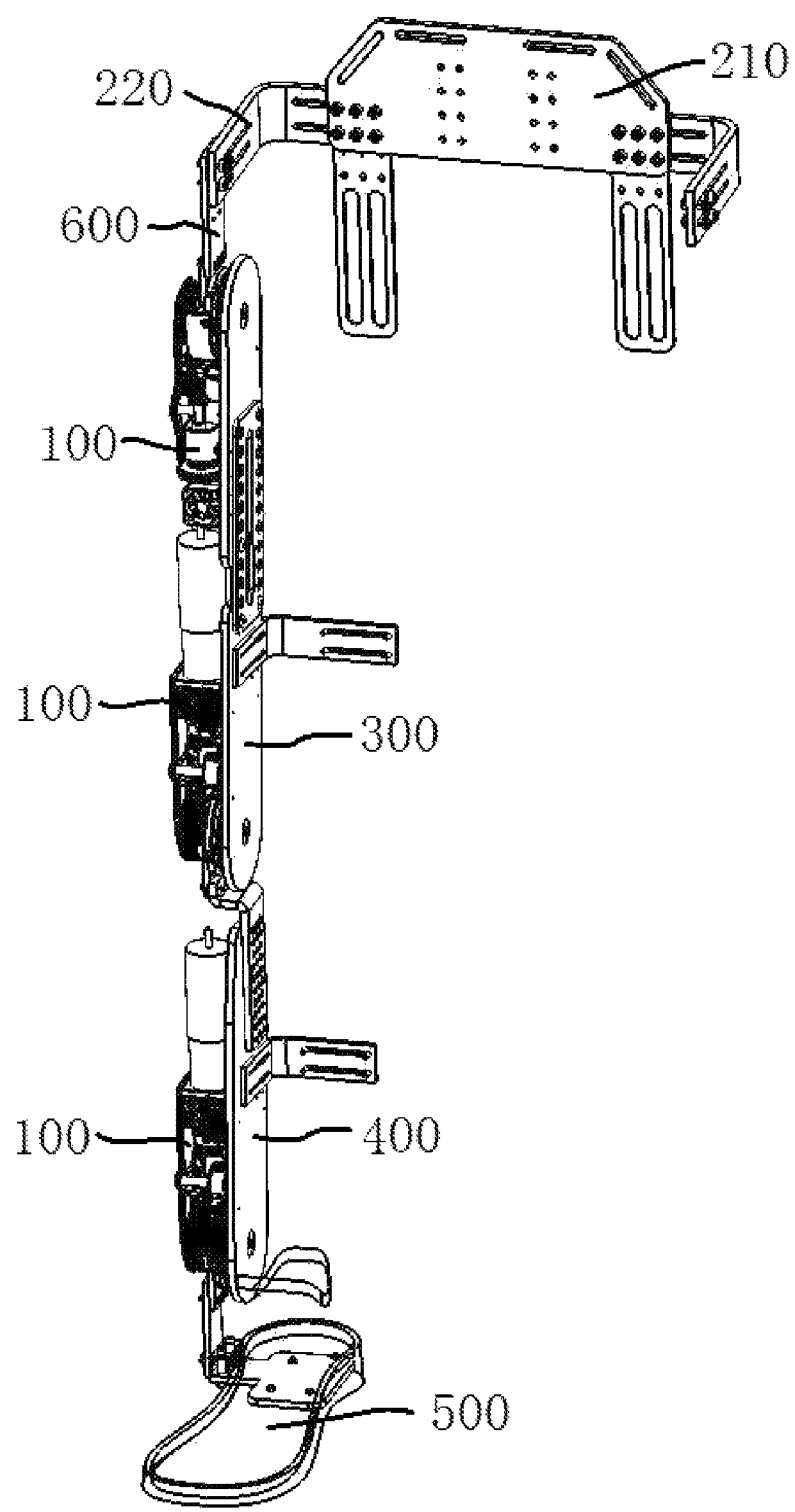
FIG. 9 is a perspective view of an exoskeleton robot according to a second embodiment of the present disclosure.

As shown in FIG. 7, there are two symmetrically-arranged leg exoskeleton assemblies in the exoskeleton robot of the first embodiment of the present disclosure. As shown in FIG. 9, according to different needs, such as a patient having a single leg, only one leg exoskeleton assembly may be remained and the other one may be omitted in a second embodiment of the present disclosure.

As shown in FIGS. 7 to 10, the lumbar support assembly 200 includes a back board 210, and side boards 220 which are disposed at both ends of the back board 210 and extended forward. The two side boards 220 are detachably connected to the back board 210 to be capable of getting close to or away from each other, thereby adapting to a waist size of a human. Specifically, both ends of the back board 210 are provided with, along the length direction thereof, a plurality of connecting positions. A sliding slot is provided correspondingly on the side board 220. A fastener passes through the sliding slot and one of the connection positions to fix the side board 220 at different positions of the back board 210, such that the distance between the two side boards 220 can be changed.

As shown in FIGS. 7 to 10, the connector 600 is detachably connected to the side board 220 so as to get close to or away from the back board 210, thereby adapting to a size of a thigh. Specifically, the side board 220 is provided with a sliding slot, which extends horizontally. Correspondingly, the connector 600 is provided with, along the length direction thereof, a plurality of connecting positions. A fastener passes through the sliding slot and one of the connecting positions to fix the side board 220 at different positions of the connector 600, such that the distances between the side board 220 and the back board 210 and between the side board 220 and the thigh member 300 can be changed.

As shown in FIGS. 7 to 10, the thigh member 300 is detachably connected to the connector 600, so as to be capable of getting close to or away from the connector 600 to adapt to a size of a thigh. Specifically, the thigh member 300 may be provided with, along the length direction thereof, a plurality of connecting positions. A fastener passes through a hole on the connector 600 and one of the connection positions, so as to fix the connector 600 at different positions of the thigh member 300 to change the distance between the thigh member 300 and the side board 220. In addition, as shown in FIG. 7, the thigh member 300 is composed of two loading boards, which are detachably connected to each other. The connecting ends of both loading boards are provided with, along the length thereof, a plurality of connecting positions, so that the connecting positions therebetween can also be changed to adjust the length of the thigh member 300 to adapt to the length of the thigh. Wherein, the thigh member 300 may be composed of only one loading board.

As shown in FIGS. 7 to 10, the lower leg member 400 is detachably connected to the thigh member 300 so as to be capable of getting close to or away from the thigh member 300 to adapt to a size of the lower leg. Specifically, the lower leg member 400 may be provided with, along the length direction thereof, a plurality of connecting positions. A fastener passes through a hole on the thigh member 300 and one of the connecting positions, so as to fix the thigh member 300 at different positions of the lower leg member 400 to change the distance between the lower leg member 400 and the thigh member 300.

As shown in FIGS. 7 to 10, the foot member 500 is detachably connected to the lower leg member 400 so as to be capable of getting close to or away from the lower leg member 400 to adapt to the size of the lower leg. Specifically, the foot member 500 may be provided with, along the length direction thereof, a plurality of connecting positions. A fastener passes through a hole on the lower leg member 400 and one of the connecting positions so as to fix the lower leg member 400 at different positions of the foot member 500 to change the distance between the foot member 500 and the lower leg member 400.

The above several adjusting structures are all provided for the purpose of adjusting the length of the leg exoskeleton assembly so as to adapt to various legs of human bodies.

Figure 10:
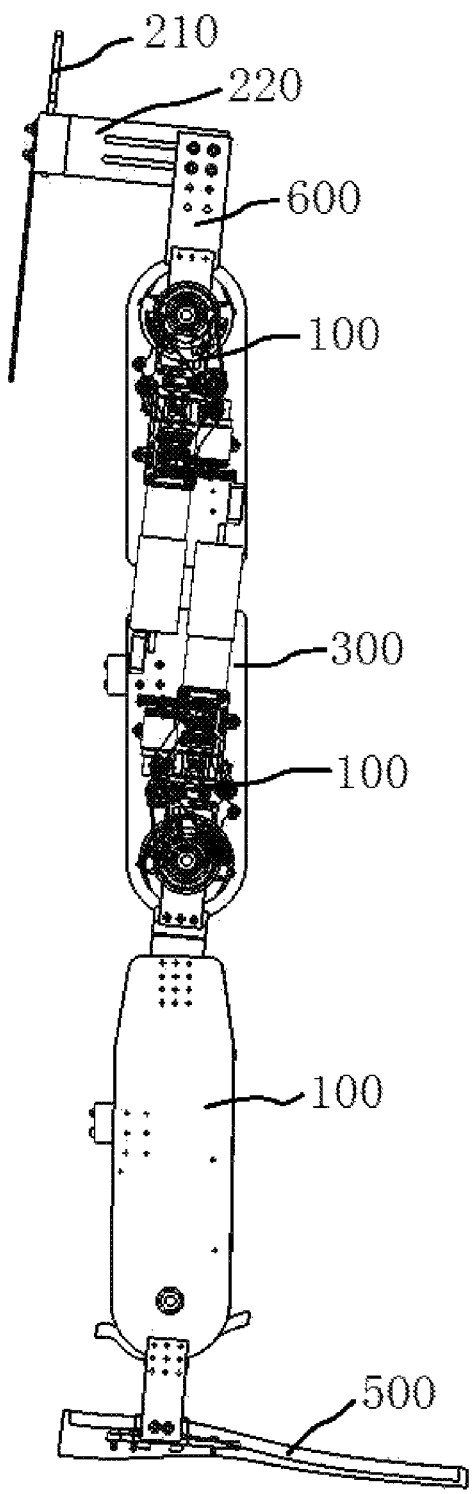
FIG. 10 is a perspective view of an exoskeleton robot according to a third embodiment of the present disclosure.

It should be understood that one or more of the flexible drivers 100 may be selectively omitted according to various requirements, for example, localized disease. As shown in FIG. 10. the flexible driver 100 is omitted for the ankle joint, while the flexible drivers 100 is provided for the hip joint and knee joint.

The robot of the present disclosure can also be applied to an exoskeleton robotic arm for the treatment of a patient having a paralyzed arm.

With reference to the accompanying drawings, the preferred embodiments of the present disclosure are described above with details. However, the present disclosure is not limited to the specific details as described in the above embodiments. A variety of simple variants can be made within the technical concept of the present disclosure. All of the variants belong to the protection scope of the present disclosure.

Further, it should be noted that the specific technical features described in the above specific embodiments can be combined in any suitable manner, as long as there is no contradiction. In order to avoid needless repetition, the present disclosure will not make further description for various possible combinations.

In addition, without departing from the concept, various combinations may also be made between the different embodiments of the present disclosure, and should be regarded as the contents of the present disclosure.

What is claimed is:

1. A flexible driver, comprising a driving mechanism, a transmission mechanism and an output mechanism,
  the transmission mechanism including an active rotating member, a driven rotating member and a rope, which form a rope drive relationship; wherein, the rope is tightly wound around rotating surfaces of the active rotating member and the driven rotating member, and a rotational central axis of the active rotating member is perpendicular to a rotational central axis of the driven rotating member,
  an output end of the driving mechanism is connected to the active rotating member, to drive rotation of the active rotating member,
  the output mechanism including a flexible driving part, and an output part which is used for connecting to an external actuator,
  the driven rotating member driving rotation of the output part through the flexible driving part.

2. The flexible driver according to claim 1, wherein the output part is mounted on a mounting shaft of the driven rotating member,
  a first receiving space is formed on the driven rotating member,
  a second receiving space, which corresponds to the first receiving space, is formed on the output part,
  the flexible driving part is received in the first receiving space and the second receiving space, such that rotation of the driven rotating member is transferred to the output part through the flexible driving part.

3. The flexible driver according to claim 2, wherein the first receiving space is formed as an arc-shaped groove extending along a circumferential direction of the driven rotating member,
  a shape of the second receiving space substantially matches the shape of the first receiving space, the flexible driving part is a spring, two ends of the spring press against two end faces of each of the first receiving space and the second receiving space.

4. The flexible driver according to claim 3, wherein both two end faces of the second receiving space are provided with limiting units extending inward, and the two ends of the spring are respectively sleeved on the limiting units.

5. The flexible driver according to claim 3, wherein the transmission mechanism further includes a spring cover, which is fixed to the driven rotating member and covers the spring,
the output part is, along an axial direction of the mounting shaft, positioned between the driven rotating member and the spring cover.

6. The flexible driver according to claim 3, wherein the flexible driver is provided with two springs, and further with two symmetrically-arranged first receiving spaces and two symmetrically-arranged second receiving spaces.

7. The flexible driver according to claim 1 wherein the active rotating member is a reel having a rotation shaft, and an output end of the driving mechanism is connected to the rotation shaft to drive rotation of the reel,
the driven rotating member is a rotating wheel,
the rope is wound around a rotating surface of the reel, and extended and wound around the rotating wheel.

8. The flexible driver according to claim 7, wherein the transmission mechanism further includes a tensioning wheel for tensioning the rope.

9. The flexible driver according to claim 8, wherein a rotational central axis of the tensioning wheel is parallel to a rotational central axis of the rotating wheel.

10. The flexible driver according to claim 1, wherein the flexible driver further includes a first sensor and a second sensor,
the first sensor is used for measuring an angular displacement and angular velocity of the output end of the driving mechanism or of an input end of the transmission mechanism,
the second sensor is used for measuring an angular displacement and angular velocity of the output part.

11. The flexible driver according to claim 10, wherein the flexible driver further includes a gear transmission group which includes a first gear and a second gear that mesh with each other,
the first gear is mounted at an output end of the driving mechanism or at an input end of the transmission mechanism,
the second gear is connected to the first sensor.

12. The flexible driver according to claim 10, wherein the flexible driver further includes a belt transmission group, which includes a driving pulley, a driven pulley and a transmission belt that form as a belt transmission,
the driving pulley is connected to the output part and rotated with it synchronously,
the driven pulley is connected to the second sensor.

13. The flexible driver according to claim 10, wherein both the first sensor and the second sensor are encoders.

14. The flexible driver according to claim 1, wherein the driving mechanism includes a motor and a decelerator,
an output shaft of the decelerator is connected to the active rotating member through a coupling.

15. A robot joint, comprising a first joint member, a second joint member and a flexible driver, the flexible driver is mounted on the first joint member and an output end of the flexible driver is connected to the second joint member,
wherein the flexible driver is the flexible driver as defined in one of claim 1.

16. The robot joint according to claim 15, wherein the first joint member is a thigh member and the second joint member is a lumbar support assembly; or
the first joint member is a thigh member and the second joint member is a lower leg member; or
the first joint member is a lower leg member and the second joint member is a foot member; or
the first joint member is a shoulder member and the second joint member is an upper arm member; or
the first joint member is an upper arm member and the second joint member is a forearm member; or
the first joint member is a forearm member and the second joint member is a hand member.

17. A robot, comprising the robot joint as defined in claim 15.

18. An exoskeleton robot, comprising a lumbar support assembly and a leg exoskeleton assembly,
the lumbar support assembly is used for supporting a waist of a human body;
the leg exoskeleton assembly is used for supporting a leg of a human body;
the leg exoskeleton assembly includes a connector, a thigh member, a lower leg member and a foot member, which are sequentially arranged to construct a leg structure of a human body, wherein
the connector is detachably connected to the lumbar support assembly;
the connector is rotatably connected to the thigh member to construct a hip joint of the leg exoskeleton assembly;
the thigh member is rotatably connected to the lower leg member to construct a knee joint of the leg exoskeleton assembly;
the lower leg member is rotatably connected to the foot member to construct an ankle joint of the leg exoskeleton;
at least one of the hip joint, knee joint and ankle joint is the robot joint as defined in claim 15.

19. The robot according to claim 18, wherein the lumbar support assembly includes a back board, and two side boards that are respectively arranged at two ends of the back board and extended forward,
the two side boards are detachably connected to the back board so as to be capable of getting close to or away from each other; and/or the connector is detachably connected to the side board so as to be capable of getting close to or away from the back board; and/or the thigh member is detachably connected to the connector so as to be capable of getting close to or away from the connector; and/or the lower leg member is detachably connected to the thigh member so as to be capable of getting close to or away from the thigh member; and/or the foot member is detachably connected to the lower leg member so as to be capable of getting close to or away from the lower leg member.

* * * * *